United States Patent [19]
Bruce, Jr.

[11] 3,865,885
[45] Feb. 11, 1975

[54] CATALYTIC CHLOROFLUORINATION OF ISOPROPYL FLUORIDE TO 1,1,2-TRICHLOROTRIFLUOROPROPENE-1

[75] Inventor: John MacMillan Bruce, Jr., Wilmington, Del.

[73] Assignee: E. I. du Pont de Nemours and Company, Wilmington, Del.

[22] Filed: Aug. 10, 1973

[21] Appl. No.: 387,477

[52] U.S. Cl............................ 260/653.3, 260/653.4
[51] Int. Cl... C07c 17/06, C07c 17/34, C07c 21/18
[58] Field of Search...................... 260/653.3, 653.4

[56] References Cited
OTHER PUBLICATIONS
Laporte, Chemical Abstracts, 63, 492f, (1965).

*Primary Examiner*—Daniel D. Horwitz

[57] ABSTRACT

A method is disclosed of chlorofluorination of isopropyl fluoride to 1,1,2-trichlorotrifluoropropene-1 using as a catalyst a combination of divalent cobalt ion and activated amorphous carbon.

5 Claims, No Drawings

CATALYTIC CHLOROFLUORINATION OF ISOPROPYL FLUORIDE TO 1,1,2-TRICHLOROTRIFLUOROPROPENE-1

BACKGROUND OF THE DISCLOSURE

The compound, 1,1,2-trichlorotrifluoroproprene-1 is known in the art as an intermediate for making fumigants as is disclosed in U.S. Pat. No. 2,917,558. A disadvantage of the prior art processes for making the compound is low yields with the resulting waste and higher costs of manufacture.

SUMMARY OF THE INVENTION

The present invention is directed to the production of 1,1,2-trichlorotrifluoroproprene-1 by chlorofluorination of isopropyl fluoride employing as a catalyst activated amorphous carbon which has been impregnated with a divalent cobalt compound. The catalyst allows extremely high conversions and yields in excess of 80 percent.

The compound is a useful intermediate for making 2-chloropentafluoropropene or hexafluoropropene.

DETAILED DESCRIPTION OF THE INVENTION

Isopropyl fluoride represents the starting compound which is subjected to chlorofluorination. This compound may be made in situ from propene and an excess of hydrogen fluoride. Later chlorofluorination of the isopropyl fluoride may be undertaken without separation of the hydrogen fluoride since it serves as a source of fluorine. Illustratively, hydrogen fluoride may be supplied in a 10 to 50 fold excess over the stoichiometric quantity needed to produce the isopropyl fluoride.

For the chlorofluorination of isopropyl fluoride, the sources of chlorine and fluorine desirably are chlorine ($Cl_2$) and hydrogen fluoride, respectively.

The catalyst in the present disclosure will be a combination of an activated amorphous carbon as charcoal and divalent cobalt ion which will be present as a solid component at the operating temperature and pressures of the reaction. The divalent cobalt ion may be present in the form of a cobalt salt. For ease of application of the divalent cobalt compound into the activated amorphous carbon, desirably the cobalt compound will be directly soluble in either water or an organic solvent. Suitable examples include $CoCl_2 \cdot H_2O$, $CoBr_2 \cdot 6H_2O$, $Co(C_2H_3O_2)_2 \cdot 4H_2O$, $Co(NO_3)_2 \cdot 6H_2O$ and $CoSO_4$.

The catalyst may also contain diluents, carriers and small quantities of impurities.

The concentration of $cobalt^{++}$ ion may be present between 0.0005 and 0.007 mole per gram of activated amorphous carbon. A preferred concentration is 0.003 to 0.005 mole of $cobalt^{++}$. At $cobalt^{++}$ ion concentrations lower than 0.0005, the yield of $CF_3CCl=CCl_2$ is reduced significantly while at $Co^{++}$ concentrations above the stated maximum, the $Co^{++}$ becomes superfluous.

In the catalytic chlorofluorination of isopropyl fluoride, a temperature is employed of between 300° to 500°C. At temperatures below 300°C., the conversion and yield of the desired compound is reduced. At temperatures above 500°C., excessive formation of by-products occurs which lowers the yield of the desired compound.

In chlorofluorination, the concentration of chlorine in relationship to isopropyl fluoride may vary over a fairly broad range. Illustratively, mole ratios of isopropyl fluoride to chlorine ($Cl_2$) may be from 0.100 to 0.166 with a preferred ratio being 0.14 to 0.166.

Also, in the chlorofluorination step, the concentration of hydrogen fluoride in relationship to isopropyl fluoride is not critical to the desired reaction. A 10 to 50 fold stoichiometric excess of hydrogen fluoride is not unusual while a preferred isopropyl fluoride/hydrogen fluoride molar ratio is in the range from 0.07 to 0.1.

In most instances, the concentration of hydrogen fluoride should be present in an excess over the other reactants since it moderates the reaction and helps reduce the extent of unwanted side reactions.

The reaction pressure is not critical. Illustrative examples of suitable operation pressures are between 1 and 10 atmospheres.

The yield of $CF_3CCl=CCl_2$ will be determined to a large extent by the contact time of the reactant materials with the catalyst. Contact times of the order of one minute or less are suitable with a general contact time of 1 to 20 seconds. An example of a preferred contact time is 3 to 8 seconds. Generally excessive catalyst contact times are to be avoided due to the potential side reactions interfering with formation of the desired compound.

To further illustrate the innovative aspects of the invention, the following Example is provided.

EXAMPLE

Catalyst Preparation

The catalyst was prepared by dissolving 50 g. $CoCl_2 \cdot 6H_2O$ in 35 ml water and pouring the solution over 40 g. of charcoal (National Carbon Co., Grade SXAC, 6–8 mesh). The bulk water was then removed by evaporation in a 120°C. oven. The catalyst was further dried, after it was packed into a nickel reactor, by heating under a stream of $N_2$ at 450°C. for about 66 hours.

Synthesis of $CF_3CCl=CCl_2$

A 1 inch × 16 inch nickel reaction tube, containing a thermocouple well running the length of the reactor, was charged with 31.5 g. (4 inch bed) of the catalyst described above. The reactor was mounted horizontally and heated by means of a 12 inch electric split tube furnace. The catalyst, after drying for about 66 hours at 450°C. as indicated above, was treated with HF (135 cc/min.) at 450°C. for one hour.

The HF (135 cc/min.) and $C_3H_6$ (12 cc/min.) were passed through a premix coil held at 0°C. whereby isopropyl fluoride was formed. The isopropyl fluoride, excess HF, chlorine (78 cc/min.) and $N_2$ (50 cc/min.) were then passed into the heated reactor maintained at a temperature of 350°C. with a catalyst contact time of about 5 seconds.

The conversion based upon isopropyl fluoride was 100 percent; the yield of $CF_3CCl=CCl_2$ was 85 percent.

Although the invention has been described by way of specific embodiments, it is not intended to be limited thereto. As will be apparent to those skilled in the art, numerous embodiments can be made without departing from the spirit of the invention or the scope of the following claims.

I claim:

1. In a catalyzed reaction at a temperature of between 300°C. and 500°C. of isopropyl fluoride with hydrogen fluoride and chlorine to form 1,1,2-trichlorotrifluoropropene-1, the improvement comprising employing a catalyst combination of a divalent cobalt compound and activated amorphous carbon.

2. The method of claim 1 wherein said divalent cobalt compound is present as a salt.

3. The method of claim 2 wherein said cobalt compound is present in an amount of at least 0.0005 mole per gram of said activated carbon.

4. The method of claim 3 wherein said activated amorphous carbon is charcoal.

5. The method of claim 4 wherein a catalyst contact time of 1 to 20 seconds is used.

* * * * *